Nov. 20, 1928.  R. LA FRANCE  1,692,553
GLASS FEEDING MECHANISM
Filed Sept. 23, 1921   3 Sheets-Sheet 1
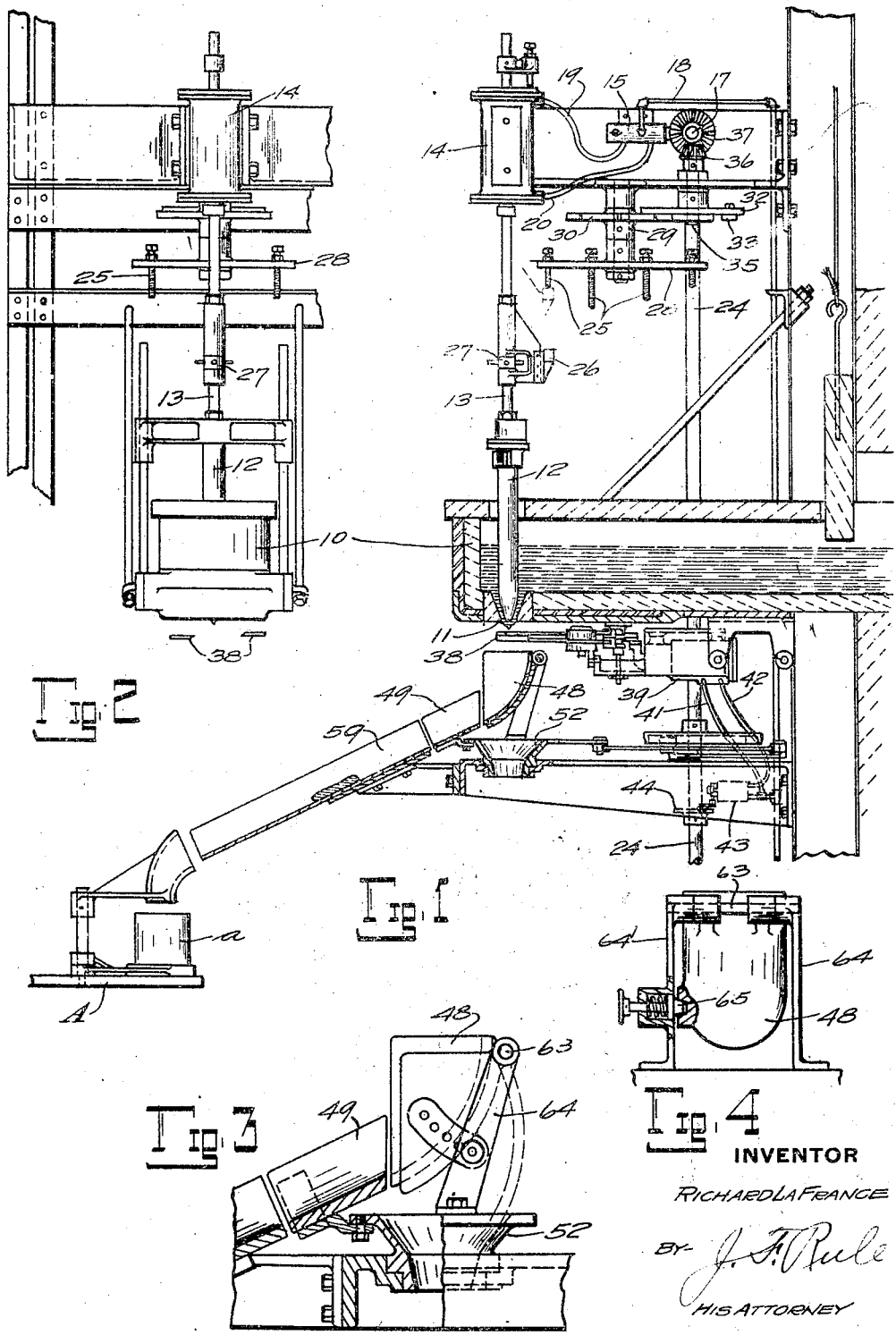
INVENTOR
RICHARD LA FRANCE
BY J. F. Rule
HIS ATTORNEY

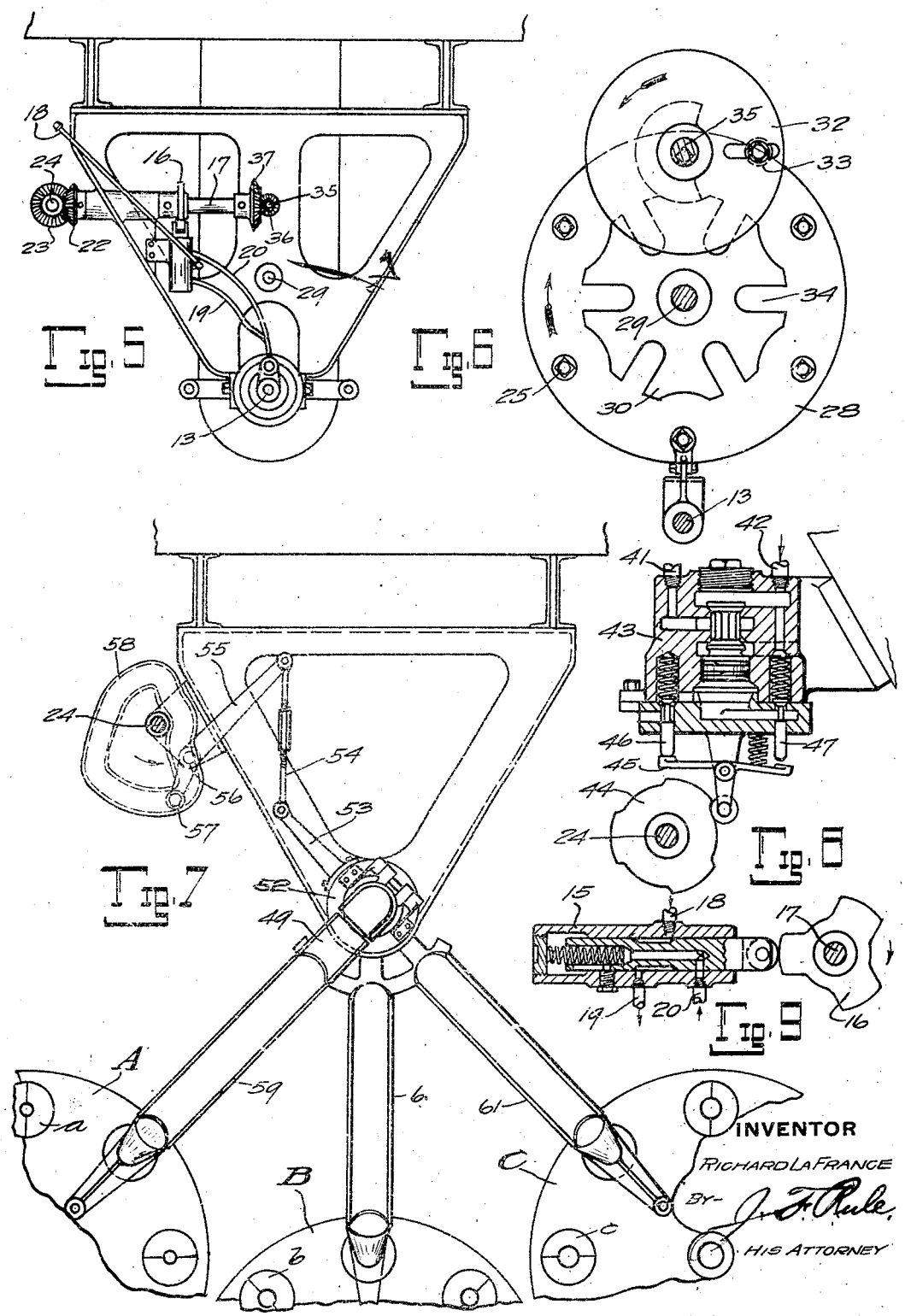

Nov. 20, 1928.
R. LA FRANCE
1,692,553
GLASS FEEDING MECHANISM
Filed Sept. 23, 1921
3 Sheets-Sheet 3

INVENTOR
RICHARD LA FRANCE
BY J. F. Rule
HIS ATTORNEY

Patented Nov. 20, 1928.

1,692,553

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS-FEEDING MECHANISM.

Application filed September 23, 1921. Serial No. 502,764.

My invention relates to apparatus for producing individual charges of molten glass for molds of glass forming machines. An object of the invention is to provide apparatus of this character adapted to deliver charges of different sizes alternately, periodically or in a predetermined sequence.

Automatic glass feeders in use at the present day are designed to deliver charges all as nearly as possible of the same size, except when the apparatus is adjusted manually to vary the size. It is often desirable to make articles of different sizes on one machine by molds of different sizes on the machine at the same time. This requires the size of the charges or gobs of glass delivered to the molds to be periodically varied to correspond to the sizes of the molds. It is also customary in the art to use a single feeder for delivering charges successively to the molds of several machines, and it is sometimes desirable to make different sized ware on the several machines, requiring larger gobs to be delivered to one machine than to another. The present invention is designed to meet the above requirements by providing suitable means to automatically supply charges of glass, and periodically vary the size of the charges to correspond with the varying sizes of molds supplied thereby.

The specific form of my invention herein disclosed, is in connection with a type of feeder in which there is provided a container for the molten glass having an outlet opening in the bottom thereof and a reciprocating plug or plunger above the outlet. The plunger as it moves downward exerts an expelling force on the glass and when it moves upward, retards the flow. The upward movement of the plunger is limited by a series of stops which are successively brought into operative position, each stop being separately adjustable to determine the upward limit of movement of the plunger. The volume of the charge of glass expelled during the descent of the plunger depends on the height to which the plunger has been lifted, so that the size of the charges may be varied in any order and to any extent desired by individually adjusting the stops.

Other features of the invention will appear hereinafter.

In the accompanying drawings:

Figure 1 is a sectional side elevation of an apparatus constructed in accordance with the principles of my invention.

Figure 2 is a front elevation thereof, parts being omitted.

Figure 3 is a part sectional side elevation of a trough switch for delivering gobs successively to a series of stationary troughs.

Figure 4 is an end elevation of the same.

Figure 5 is a top plan view of the apparatus.

Figure 6 shows a Geneva movement for rotating the stops.

Figure 7 is a plan view of the mechanism below the furnace boot for conveying the charges to the molds on a number of machines.

Figure 8 is a detail of valve mechanism controlling the operation of the shears.

Figure 9 is a sectional view of the valve controlling the supply of air to the motor which operates the plunger.

Figure 10:
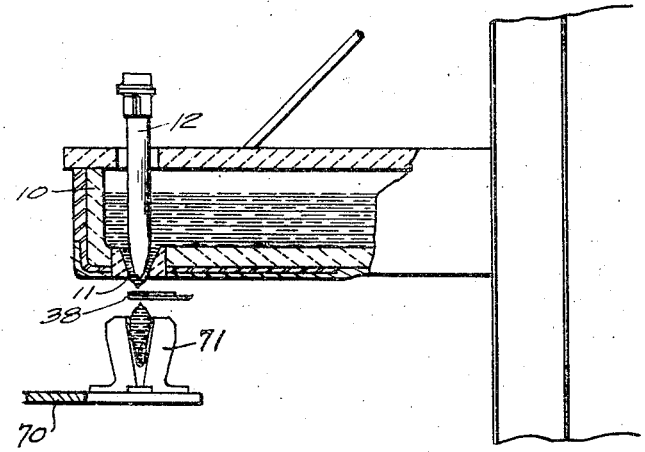
Figure 10 is a part sectional elevation showing an arrangement of parts permitting the gobs to drop directly into the molds of a forming machine.

The molten glass is supplied from a furnace boot or extension 10 having an outlet orifice 11 in the bottom thereof through which the glass issues. The flow of glass is controlled by a vertically reciprocating plug or plunger 12 carried by a rod 13 attached to the piston of an air motor 14. This motor operates to move the plunger up and down periodically at regular intervals. The downward movement of the plunger exerts an expelling force on the issuing glass, and the upward movement of the plunger retards or reverses the movement of glass at the outlet. The plunger also acts as a valve and restricts the flow when in its lowered position.

The motor is controlled by a valve 15 (see Fig. 9) actuated by a cam 16 on a continuously rotating horizontal shaft 17. With the valve in the Figure 9 position, air under pressure is supplied through the pressure pipe 18 and valve to a pipe 19 leading to the upper end of the motor cylinder. The air beneath the motor piston is exhausted through a pipe 20. When the valve is reversed, the pressure is supplied to the motor through the pipes 18 and 20, and the pipe 19 is connected to the exhaust. The shaft 17 is connected through bevel gears 22 and 23 (Fig. 5) to a vertical drive shaft 24 which is continuously rotated, being driven from any suitable source of power.

The upward movement of the plunger is limited by stops 25 which are successively brought into operative position above a stop 26 mounted on the rod 13. The stop 26 is adjustable up and down on the rod 13 by means of a hand wheel or collar 27 screw threaded on the rod. The stops 25 are carried by a disk 28 and are individually adjustable up and down therein. The disk 28 is keyed to a vertical shaft 29 to which is also keyed a Geneva wheel 30. The latter is given a step by step rotation by means of a continuously rotating driving element 32 having a pin 33 to engage slots 34 in the wheel 30. The driver 32 is mounted on a vertical shaft 35 on which is a bevel pinion 36 driven by a bevel gear 37 on the shaft 17.

The cutting mechanism for severing the individual masses or gobs of glass may be of any usual or approved construction and as herein shown, comprises a pair of cutters 38 actuated by mechanism such as shown in the co-pending application of A. N. Cramer, Serial Number 401,638, filed August 6, 1920. The cutters 38 are actuated by an air motor 39 having air connections 41 and 42 to a controlling valve 43 (see Fig. 8) actuated by a cam 44 on the drive shaft 24. The cam 44 operates through a T-lever 45 to alternately open the poppet valves 46 and 47, thereby periodically reversing the air connections to the shear operating motor 39 in a well known manner and thus causing the shears 38 to operate periodically.

It will be noted that the cam 44 controlling the operation of the shears is so shaped that each complete rotation of the drive shaft 24 will effect three shearing operations. Also, the cam 16 which rotates at the same peripheral speed as the drive shaft will effect three reciprocations of the plunger during a rotation of the drive shaft. The gearing for advancing the stops 25 is so proportioned that the disk 28 will be advanced one step after each reciprocation of the plunger, so that each succeeding operation of the plunger is controlled by a different stop.

The charges of glass may be suspended from the walls of the orifice 11 during their formation, and when severed by the shears 38 drop onto a deflector 48 and slide down a swinging trough section 49 and stationary troughs to molds on machines A, B and C. These machines carry respectively molds $a$, $b$ and $c$, which as shown are of different sizes. The parts 48 and 49 are carried on an oscillating funnel-shaped member 52 to which is attached an arm 53 connected through a link 54 to a lever 55 fulcrumed at 56 and carrying a cam roll 57 running on a cam 58 on the drive shaft 24. The cam 58 is shaped to impart intermittent movements to the lever 55, the extent of the movements being such that the trough section 49 is caused to register successively with the stationary troughs 59, 60 and 61, so that the successive gobs of glass are delivered to molds $a$, $b$ and $c$ in succession in a manner well understood in the art. The deflector 48 is mounted to swing about a horizontal fulcrum pin 63 carried by brackets 64 on the funnel 52. The deflector is held in register with the section 49 by a spring detent 65. By withdrawing the detent the deflector may be swung down, permitting the glass to escape through the funnel 52.

When the molds on the several machines are of different sizes, as indicated in Figure 7, the stops 25 will be correspondingly adjusted so that each mold will receive a charge of the required size. The stops which limit the upward movements of the plunger directly preceding the downward strokes which expel the gobs delivered to the molds $a$, will be adjusted to permit a comparatively short plunger stroke. The other stops will be adjusted for longer strokes corresponding to the weight of the charge required. If desired, the individual molds on any one of the several machines A, B and C may be of different sizes. For example, every other mold on the machine A might be larger than the intermediate molds.

Figure 11:
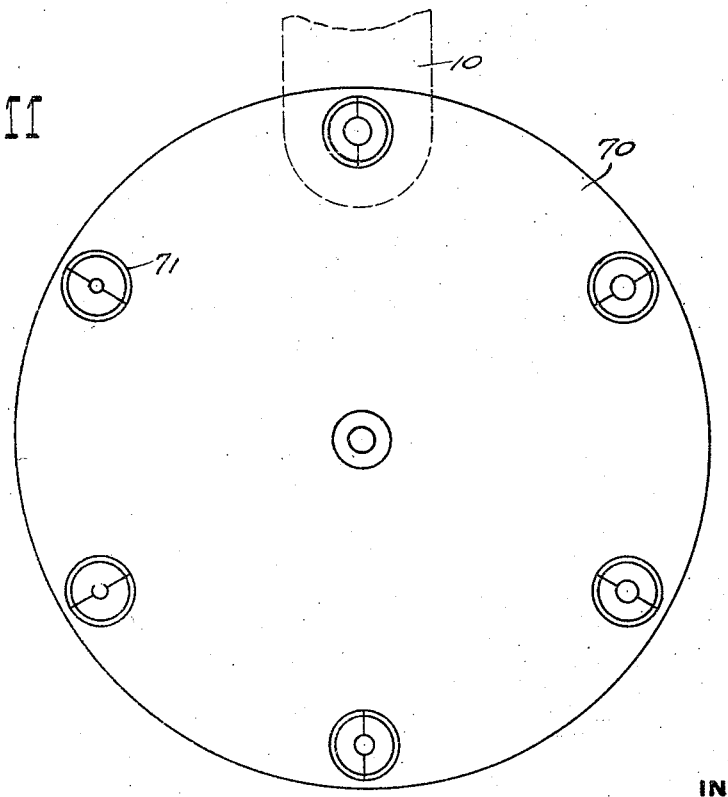
Figure 11 is a diagrammatic plan showing such arrangement.

Referring to Figures 10 and 11, the feeder may deliver the gobs directly to the molds of a forming machine 70, the molds 71 thereon being successively brought to charging position directly beneath the outlet 11 by the rotation of the mold carriage. As indicated in Figure 11, the mold cavities are of different sizes. The number of molds, as shown, is the same as the number of stops 25 on the disk 28, so that in the operation each stop controls the plunger operation for feeding to one particular mold. Similar results could obviously be obtained by having a different relative number of stops and molds. For example, the number of molds might be double that of the number of stops so that each stop would control the same two molds throughout the operation of the machine.

It will be understood that the size of the charges of glass may be automatically varied by various means other than those herein shown for arresting the plunger at different heights and also in other ways than by varying the upward limit of movement of the plunger. For example, the plunger might be arrested at different positions in its downward movement. The speed of the plunger during its upward or downward movement, or both, might be varied. The time at which the cutter operates relative to the plunger operation might be varied. The length of time between successive operations of both the plunger and cutter might be varied periodically. The plane in which the cutter operates might be shifted up and down periodically. The size of the outlet orifice might be periodically varied. A periodic variation in the size and shape of charges of glass might be produced in any of the above mentioned ways.

Modifications other than those herein mentioned may be resorted to within the spirit and scope of my invention.

What I claim is:

1. The combination of a stationary container for molten glass having a discharge orifice, a plunger controlling the flow of glass through said orifice, means to reciprocate the plunger, and automatic devices separate from said means and operating in succession to vary successive reciprocations of the plunger.

2. The combination of a stationary container for molten glass having a discharge orifice, a plunger controlling the flow of glass through said orifice, means to reciprocate the plunger and cause a measured volume of glass to be discharged for each reciprocation of the plunger, and automatic devices separate from said means to selectively vary the reciprocations of the plunger and thereby selectively vary said volumes of glass.

3. The combination of a container for molten glass having an outlet orifice, a valve controlling the discharge of glass from said orifice, means to periodically actuate said valve, a plurality of stops to limit the movement of the valve, and automatic means to bring said stops successively into operative relation to the valve.

4. The combination of a receptacle for molten glass having an outlet through which the glass is discharged, a device operable periodically to control said discharge, a series of stops to limit the movement of said controlling device, and automatic means to bring said stops successively into operative relation to said device.

5. The combination of a receptacle for molten glass having an outlet through which the glass is discharged, a device operable periodically to control said discharge, a series of stops to limit the movement of said controlling device, and automatic means to bring said stops successively into operative relation to said device, said stops being individually adjustable to selectively vary the extent of movements of said controlling device.

6. The combination of a container for molten glass having an outlet through which the glass is discharged, a controlling device, means to operate it periodically to control the flow of glass through the outlet, a series of stops, a carrier on which said stops are mounted, and means to rotate said carrier step by step and thereby bring the stops successively into the path of said controlling device, said stops when in operative position projecting different distances to thereby permit movement of the controlling device through corresponding distances.

7. The combination of a container for molten glass having an outlet through which the glass is discharged, a controlling device, means to operate it periodically to control the flow of glass through the outlet, a series of stops, a carrier on which said stops are mounted, and means to rotate said carrier step by step and thereby bring the stops successively into the path of said controlling device, said stops when in operative position projecting different distances to thereby permit movement of the controlling device through corresponding distances, the stops being individually adjustable to vary the extent of movement of the controlling device.

8. The combination of a container for molten glass having an outlet orifice in the bottom thereof, a plunger extending into the glass above said orifice, means to reciprocate the plunger vertically, a series of stops, and means to bring the stops successively into position to arrest the movement of said plunger in one direction, said stops being of different lengths to thereby vary the amplitude of movement of the plunger.

9. The combination of a container for molten glass having an outlet orifice in the bottom thereof, a plunger extending into the glass above said orifice, means to reciprocate the plunger vertically, a horizontally rotating carrier, a series of stops thereon, and means to rotate the carrier step by step to bring the stops successively into position to arrest the upward movement of the plunger.

10. The combination of a container for molten glass having an outlet orifice in the bottom thereof, a plunger extending into the glass above said orifice, a piston motor connected to reciprocate the plunger, a carrier, an annular series of stops thereon, and means to rotate the carrier step by step and thereby bring the stops successively into position to arrest the upward movement of the plunger.

Signed at Toledo, in the county of Lucas and State of Ohio, this 20th day of September, 1921.

RICHARD LA FRANCE.